(12) United States Patent
Neff

(10) Patent No.: US 6,278,498 B1
(45) Date of Patent: Aug. 21, 2001

(54) APPARATUS AND METHOD FOR COMBINING DIGITAL AND ANALOG TELEVISION SIGNALS

(75) Inventor: David J. Neff, Wexford, PA (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/053,337

(22) Filed: Apr. 1, 1998

(51) Int. Cl.[7] .................................. H04N 5/38; H04N 7/12
(52) U.S. Cl. .................... 348/723; 348/487; 348/484; 348/21
(58) Field of Search .................... 348/723, 21, 724, 348/487, 486, 484; 333/126; 455/129, 103, 91, 108; 343/795, 720, 768

(56) References Cited

U.S. PATENT DOCUMENTS

| | | | |
|---|---|---|---|
| 4,238,855 | * | 12/1980 | Zborowski ............................ 455/103 |
| 4,240,155 | * | 12/1980 | Vaughan ................................ 370/69 |
| 4,310,854 | * | 1/1982 | Baer ..................................... 358/143 |
| 4,339,772 | * | 7/1982 | Eilers et al. .......................... 358/144 |
| 4,491,871 | * | 1/1985 | Schmitz et al. ....................... 358/186 |
| 5,111,287 | * | 5/1992 | Citta et al. ............................ 348/487 |
| 5,412,426 | * | 5/1995 | Totty .................................... 348/385 |
| 5,450,392 | * | 9/1995 | Waltrich ................................. 370/6 |
| 5,497,166 | * | 3/1996 | Mahnad ................................ 343/795 |
| 5,774,193 | * | 6/1998 | Vaughan ............................... 348/723 |
| 5,929,821 | * | 7/1999 | Goldstein et al. .................... 343/770 |

OTHER PUBLICATIONS

Hulick, T.P., "Adjacent Channel DTV/NTSC Television Trnasmitters Using the Diacrode Tetrode Solution", A Presentation by Timothy P. Hulick, (Nov. 1997).

* cited by examiner

Primary Examiner—Victor R. Kostak
(74) Attorney, Agent, or Firm—Fogg Slifer & Polglaze, PA

(57) ABSTRACT

An adjacent channel combiner combines an analog television channel with an upper adjacent digital television channel using practical filter designs. An aural signal of the analog television channel is combined after both a visual signal and a digital signal have been combined. A directional filter combines the visual and digital signals and a diplexer or other means is used for combining the aural signal with the combined visual and digital signal.

21 Claims, 5 Drawing Sheets

APPARATUS AND METHOD FOR COMBINING DIGITAL AND ANALOG TELEVISION SIGNALS

TECHNICAL FIELD OF THE INVENTION

The present invention relates generally to television transmitters and in particular to an apparatus and method for combining digital and analog television signals.

BACKGROUND OF THE INVENTION

An analog television signal is a combination of a visual signal and an aural signal, which is in accordance with National Television Systems Committee (NTSC) standards. The visual signal is a vestigial side-band, amplitude-modulated, bandwidth limited picture signal. The aural signal is a separate, frequency modulated sound signal. The combined visual and aural signal represents a television signal. These combined signals typically occupy a particular frequency band known as a television channel. Each television channel has a unique frequency band so that information contained within each channel remains intact when the signals are converted by a standard television receiver.

With the advent of digital television (DTV), the Federal Communications Commission (FCC) has assigned new channels to television broadcast stations in the United States for the purpose of facilitating a transition to digital television. Many television broadcast stations were given a digital channel adjacent, or next to, their existing analog television channel for allowing simultaneous broadcast of analog and digital television signals. These television broadcast stations have a desire to multiplex or combine these two channels into one transmission line in order to minimize transmission costs by using a single tower, transmission line, and antenna. Furthermore, broadcasting analog and digital television signals prevents analog television sets from becoming obsolete during a gradual transition to digital television service.

However, the simultaneous broadcast of adjacent analog and digital television channels presents challenges for television broadcast stations, particularly with respect to filtering the analog and digital signals so that they do not interfere with one another when the channels are combined for broadcast. This problem is more acute when the digital television channel is above the analog television channel in the frequency spectrum. In this particular arrangement, there is a very minimum guard band separating the digital signal within the digital television channel and the aural signal within the analog television channel. The aural signal occupies an upper portion of the analog television channel such that its carrier is only 250 KHZ from the digital television channel. Combining the aural signal and the digital signal together requires strict filtering performance that can only be provided by a complex and expensive filter due to this minimal separation between these two signals.

The difficulty in providing a filter design using conventional filtering techniques for combining adjacent analog and digital television channels is illustrated with reference to FIG. 1. FIG. 1 illustrates a frequency spectrum diagram for an adjacent analog television channel 2 and a digital television channel 4. A problem with the simultaneous broadcast of these channels 2, 4 is that there is very little guard band 12 between a digital signal 5 of the digital television channel 4 and an aural signal 10 of the analog television channel 2.

To make matters worse, the digital signal 5 requires a filter having approximately a flat frequency response (represented by reference 6) across much of the six MHZ digital television channel 4 yet providing high attenuation outside the channel. Even assuming the digital signal 5 has been adequately attenuated to provide a sufficient roll-off in the transition band 8, the aural signal 10 still presents a problem because it is only 250 KHZ away (represented by reference 12) from the upper edge of the 6 MHZ analog television channel 2.

This minimum separation problem between the aural signal 10 and the upper adjacent digital signal 5 has been recognized by those skilled in the art, but solutions have been slow in forthcoming due to the gradual transition to the transmission of digital signals and the fact that there are no available practical filter techniques for separating the aural signal from an upper adjacent digital signal. As an alternative solution, television broadcast stations are looking into using separate antennas to separately broadcast the two channels.

If the digital television channel 4 is below the analog channel 2, the problem is less severe since a carrier of the visual signal 14 is 1.25 MHZ (represented by reference 16) above the lower edge of the analog television channel 2. The analog TV transmitter supports sidebands to −0.75 MHZ from the visual carrier, resulting in a guard band of 0.5 MHZ between channel edge and the start of important sideband energy. Furthermore, the analog receiver includes a weighing function called a nyquist slope that varies linearly from zero voltage response at the channel edge through 0.5 voltage response at visual carrier to unity response at +1.25 MHZ from the visual carrier and at higher frequencies. The nyquist slope weighing function also serves to mitigate the distortion effects of rolloff of the analog signal by the digital/analog multiplexing filter.

Therefore, what is needed is a technique that allows for the simultaneous broadcast of analog and digital television channels, particularly when the digital channel is located above the analog channel in the frequency spectrum (referenced to herein as an upper adjacent digital television channel or N+1). For the reasons stated above, and for other reasons stated below which will become apparent to those skilled in the art upon reading and understanding the present specification, there is a need in the art to combine two adjacent television channels (an analog channel and an upper adjacent digital channel) for transmitting via one transmission line without using complex and expensive filter designs.

SUMMARY OF THE INVENTION

A television channel combiner combines an analog television channel with an upper adjacent digital television channel by combining the aural portion of the analog signal after both the visual signal and a digital signal are combined. Since the aural signal is not present when the visual signal and the digital signal are initially combined, a simple bandpass directional filter combines the visual signal with the digital signal. The aural signal is later combined through a notch diplexer if one exists, or through an additional directional filter. The multiplexed digital and analog television channels are transmitted over a common communications path.

In one embodiment, an adjacent channel combiner comprises a directional filter and a notch diplexer. The directional filter combines a digital signal of a digital television channel with a visual signal of an analog television channel, wherein the digital television channel is upper adjacent to the analog television channel. The notch diplexer combines the combined digital and visual signal with a separate aural signal of the analog television channel for transmission using a common path. Since a notch diplexer is already present at many transmitter sites, this approach would only require the addition of the visual/digital combiner. The notch diplexer also provides attenuation of energy near the aural carrier frequency that may be present in the combined visual/digital signal.

Other embodiments include a method of combining an analog television channel with an immediately upper adjacent digital television channel. The method comprises the steps of combining a digital signal with a visual signal, and then combining an aural signal with the combined digital and visual signal.

An advantage of combining an analog television channel with an upper adjacent digital television channel permits television broadcast stations to transmit these two channels simultaneously. Television broadcast stations realize a cost savings by using existing equipment to transmit the digital channel along with the analog channel. Since the aural signal is combined after both the visual and digital signal have been combined, simple and inexpensive filters are used to combine these channels. For instance, many television broadcast stations already have in place a notch diplexer for combining the aural signal with the visual signal for current analog television channels. By adding a simple directional filter for combining the digital signal with the visual signal, the notch diplexer remains in tact for combining the aural signal with the output of the directional filter.

Therefore, an adjacent channel combiner that adds the aural signal after both the visual signal and the digital signal have been combined allows for a simple and inexpensive way to combine an analog television channel with a digital television channel that is immediately upper adjacent. In different embodiments of the invention varying techniques of combining the aural signal with the combined visual and digital signal are described. For instance, either a notch diplexer or a second directional filter can be used to combine the aural signal with the combined visual and digital signal. Still other and further embodiments, aspects and advantages of the invention will become apparent by reference to the drawings and by reading the following detailed description.

DETAILED DESCRIPTION OF THE INVENTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention combines an analog television channel (having a visual signal and a separate aural signal) with an upper adjacent digital television channel (having a digital signal) using practical filter designs. A practical filter design refers to one that is not complex and expensive to produce. Filter size is also a parameter that determines whether a particular filter design is practical, wherein a smaller size is more practical than a larger sized filter. The visual signal and the digital signal are combined using a directional filter. Next, the combined visual/digital signal is combined with the aural signal. The present invention allows a common transmission line and antenna to transmit both analog and digital television channels that are adjacent to each other with the use of practical filter designs despite the close proximity of the frequency of the analog channel's aural carrier to the digital channel. A television transmission system utilizing an adjacent channel combiner is first described, wherein the television transmission system serves as an environment for the present invention. Detailed block diagrams of embodiments of an adjacent channel combiner according to the teachings of the present invention are also presented.

A digital television channel that is upper adjacent to an analog television channel refers to the situation wherein the digital television channel is the next immediately adjacent television channel next higher in frequency than the analog television channel. Therefore, an upper adjacent digital television channel is located above the analog television channel in the frequency spectrum such that no other channels operate in between.

Figure 2:
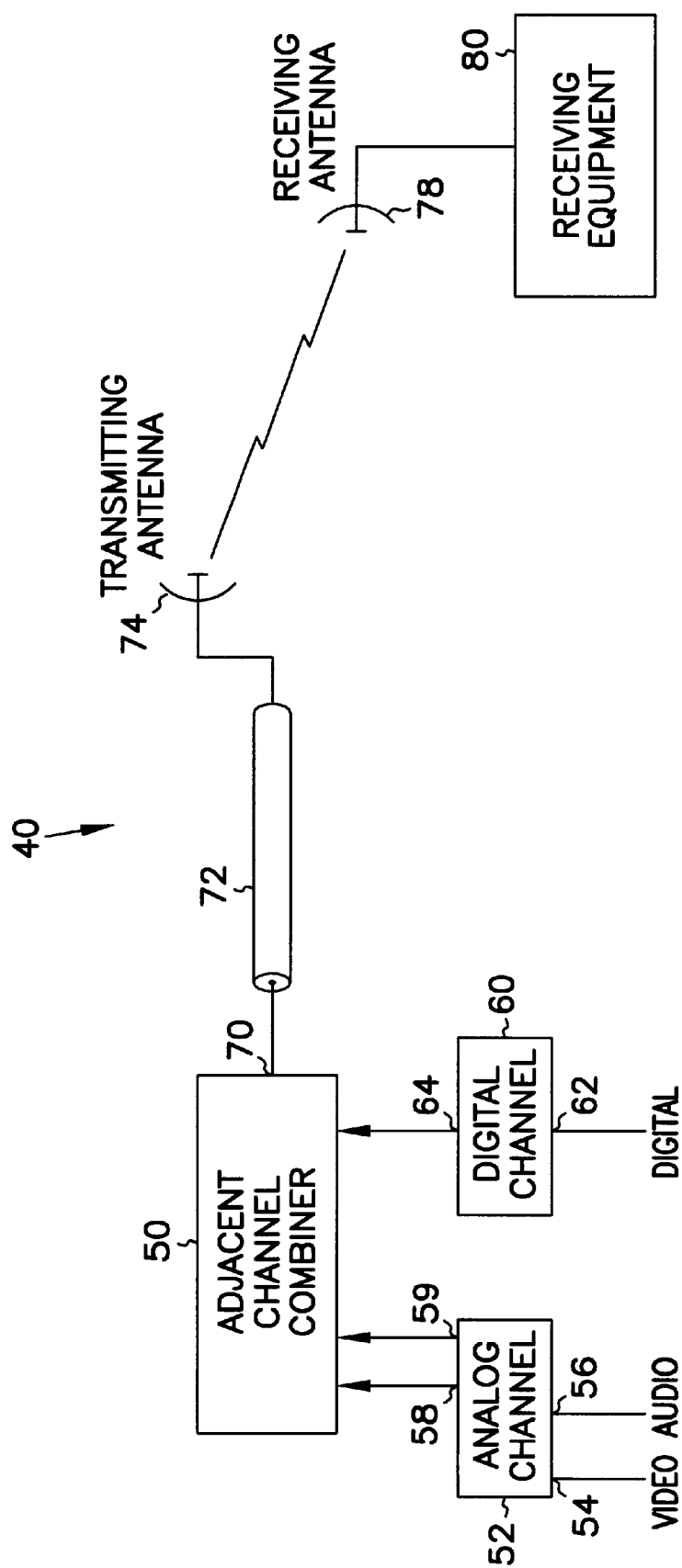
FIG. 2 is block diagram of an embodiment of a television transmission system utilizing an adjacent channel combiner according to the teachings of the present invention.

FIG. 2 is a block diagram of an embodiment of a television transmission system 40 utilizing an adjacent channel combiner 50 according to the teachings of the present invention. Television transmitters within the television transmission system 40 operate in three frequency bands. One is low-band VHF for channels 2–6 (54–88 MHZ), another is high-band VHF for channels 7–13 (174–216 MHZ), and a third is UHF for channels 14–83 (470–890 MHZ). The adjacent channel combiner 50 combines an analog television channel with an upper adjacent digital television channel operating within anyone of these three frequency bands.

Figure 1:
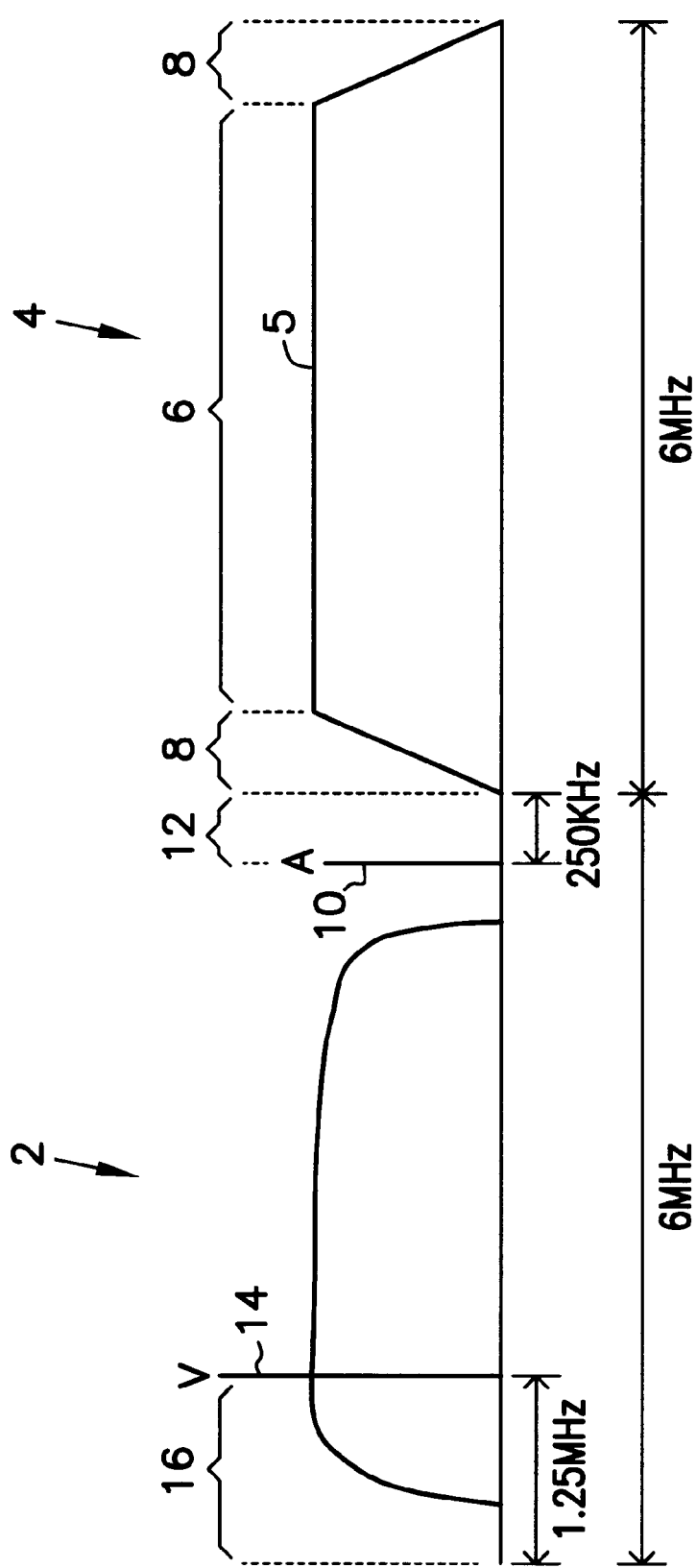
FIG. 1 illustrates a frequency spectrum diagram for adjacent analog and digital television channels.

Analog and digital signals operating within respective analog and digital channels are represented by the example signals illustrated in FIG. 1. The analog television channel and the digital television channel can transmit either the same or different television program signals. The analog television channel 2 is a combination of a visual signal 14 and an aural signal 10. The visual signal 14 is a vestigial side-band, amplitudemodulated, bandwidth limited picture signal having its carrier at 1.25 MHZ from the left (lower) edge of the analog channel 2. The visual signal 14 occupies 4.2 MHZ of the channel above its carrier. The aural signal 10 is a separate, frequency modulated sound signal having its carrier centered 250 KHZ from the upper edge of the analog television channel 2.

The digital signal 5 is an 8 level vestigial side band digitally modulated signal. This particular format has been selected as the digital television standard to be implemented within the United States. One skilled in the art will readily recognize that other digital modulation schemes are within the scope of the present invention. The digital signal 5 requires a filter having approximately a flat frequency response across much of its 6 MHZ channel yet providing high attenuation outside the channel. The transition band region on either side of the digital signal 5 is approximately 310 KHZ wide from the channel edge to where the power spectral density is flat.

Positioning of the aural signal 10 with respect to the visual signal 14 and the digital signal 5 presents a problem for practical filter designs because of the minimal separation between these signals. This separation varies depending upon the type of aural signal 10 transmitted. For instance, a monophonic transmission requires the aural signal 10 to occupy +/−25 KHZ from its carrier. If the aural signal 10 is transmitting stereo, there are important sidebands that occupy substantially more than +/−25 KHZ from the carrier center frequency. In such cases the aural signal 10 occupies as much such +/−100 KHZ from the carrier center frequency. Therefore, the guard band between the aural signal 10 and the upper edge of the visual signal 14 and between the lower edge of the digital signal 5 is very small.

An analog transmitter 52 for an analog channel 2 receives separate video (picture) and audio (sound) signals applied to inputs 54 and 56, respectively. Outputs 58 and 59 of the analog transmitter 52 are coupled to the adjacent channel combiner 50, wherein output 58 corresponds to the RF visual (picture) signal and output 59 corresponds to the RF aural (sound) signal. Similarly, a digital transmitter 60 has a digital signal applied to input 62, and modulated output 64 is likewise coupled to the adjacent channel combiner 50.

The adjacent channel combiner 50 combines the visual signal 14 and the digital signal 5 separate from the aural signal 10. Once the visual and digital signals 14, 5, respectively, have been combined, the aural signal 10 is then combined to produce a composite signal containing both the analog television channel 2 and the digital television channel 4. The adjacent channel combiner 50 is described in more detail with reference to FIG. 3.

The composite signal from output 70 of the adjacent channel combiner 50 is coupled to a transmission line 72. For a system operating in the UHF frequency range, a length of waveguide may be used for the transmission line 72. The transmission line 72 carries the composite signal from the adjacent channel combiner 50 to a transmitting antenna 74. The transmitting antenna 74 transmits the composite signal through the air to a receiving antenna 78 feeding standard receiving equipment 80. An output signal from the transmitting antenna 74 resembles the frequency spectrum illustrated in FIG. 1 for an adjacent analog television channel and a digital television channel. Those skilled in the art will appreciate that the principles of the present invention can be applied to other transmission network systems without departing from the scope of the invention.

Figure 3:
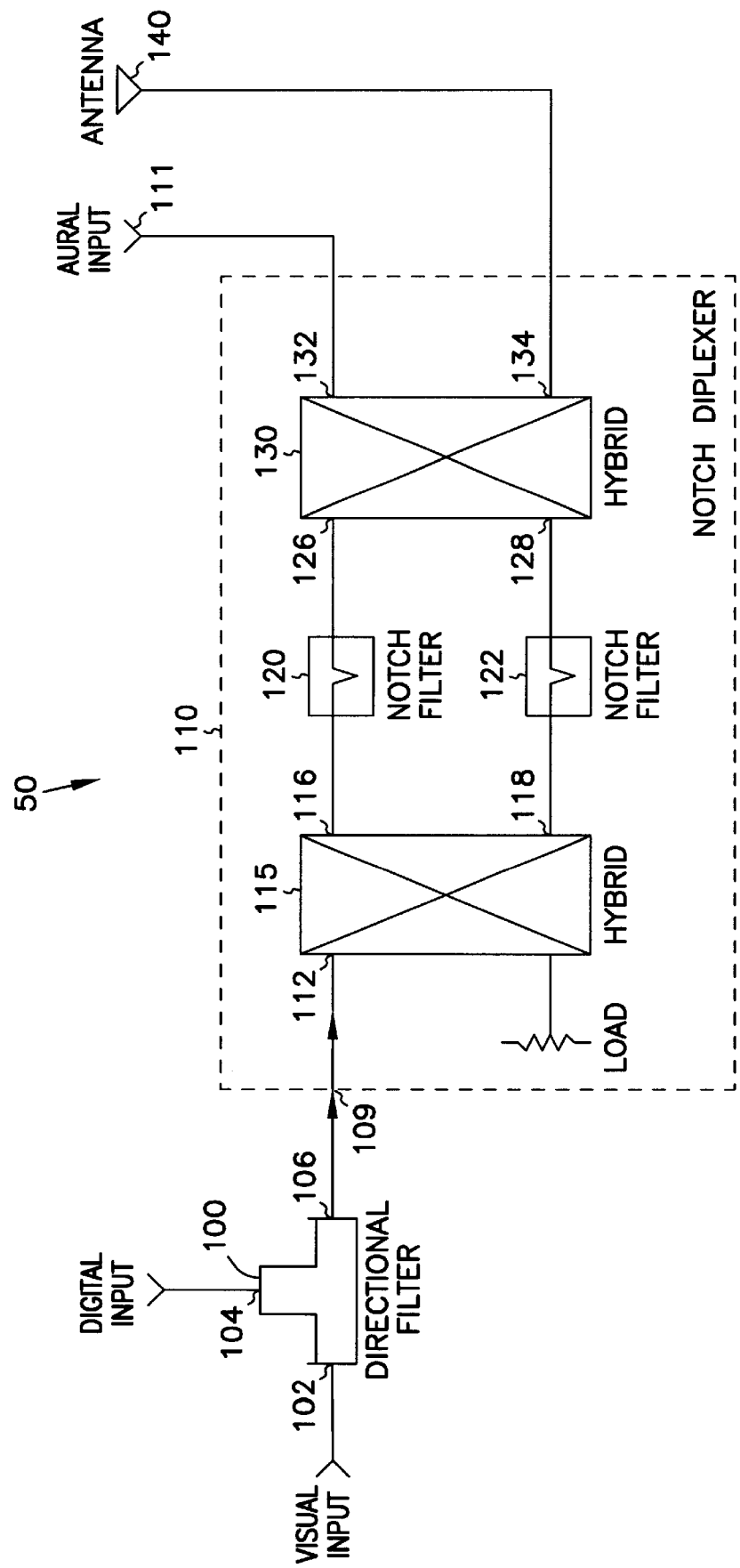
FIG. 3 is a detailed block diagram of an embodiment of an adjacent channel combiner according to the teachings of the present invention.

FIG. 3 is a detailed block diagram of an embodiment of the adjacent channel combiner 50 according to the teachings of the present invention. A directional filter 100 receives a visual signal 14 via input 102 and a digital signal 5 via input 104. Once the two signals have been received, they are combined by the directional filter 100 to produce a combined visual/digital signal.

Since the aural signal 10 is not applied to the directional filter 100, an additional guard band is provided between the visual signal 14 and the digital signal 5. In addition to having the benefit of an additional guard band separating the two signals, the requirements for the directional filter 100 are relaxed due to less stringent filtering requirements without the presence of the aural signal 10. Another benefit of not having the aural signal 10 present at the directional filter 100 is that the digital filter portion of the directional amplifier 100 can be wider than the digital television channel 4. Therefore, design criteria for the directional filter 100 are not as stringent and are more easily met by using practical filter designs.

A performance criteria of the directional filter 100 is that the roll-off is fast enough to not interfere with the visual signal 14. Since the absence of the aural signal 10 allows the digital filter portion of the directional filter 100 to operate wider than the digital channel 4, the roll-off slope can be ideally positioned between an upper end of the visual signal 14 and a lower end of the digital channel 4. For example, the digital filter portion could be skewed and off-center with respect to the actual digital television channel 4 for positioning the roll-off slope in a desired position.

Next, the combined visual/digital signal from output 106 of the directional filter 100 is applied to input 109 of a notch diplexer 110. The notch diplexer 110 illustrated in FIG. 3 can be fabricated by someone of ordinary skill in the art.

The notch diplexer 110 combines the aural signal 10 applied to input 11 with the combined visual/digital signal by utilizing hybrids 115, 130 and notch filters 120, 122. The ports of hybrids 115, 130 are offset by 90 degrees to split and/or combine input or output signals. The notch filters 120, 122 reject the presence of the aural signal 10. One skilled in the art will realize that alternative embodiments to the notch diplexer 110 can be utilized without departing from the scope of the invention which is to combine the aural signal 10 down stream with the visual signal 14 and the digital signal 5 after the latter two signals have been combined.

The combined visual/digital signal received by input 109 is applied to a first hybrid 115 which functions as a signal splitter. The combined visual/digital signal is equally split between output ports 116 and 118. The split signals travel through first and second notch filters 120 and 122, respectively. The notch filters 120, 122 are notched at the frequency corresponding to that of the aural signal 10 so that any energy present from the aural signal 10 is reflected and will be summed to the load.

After the output signals from the first hybrid 115 travel through the notch filters 120, 122, respectively, they are applied to input ports 126, 128, respectively, of a second hybrid 130. With respect to the signals received from the first hybrid 115, the second hybrid 130 functions as a combiner for these two signals so that a visual signal 14 and a digital signal 5 are present at output port 134. Since the combined visual/digital signal was shifted 90 degrees by the first hybrid 115, the second hybrid 130 offsets the signal a second time so that the signals are summed to output port 134.

Parallel with passing the combined visual/digital signal through the first and second hybrids 115, 130, respectively, an aural signal 10 is applied to input port 132 of the second hybrid 130. The aural signal 10 travels through the second hybrid 130 which first functions as a splitter so half of the aural signal 10 is applied to notch filter 120 and the other half of the aural signal 10 is applied to notch filter 122. As previously stated, both notch filters 120, 122 are tuned to reject the aural carrier frequency. The rejected aural signals 10 are then reflected back to ports 126, 128, respectively. Since the hybrids 115, 130 are off set by 90 degrees, the reflected aural signals 10 from the notch filters 120, 122 are off-set a second time by the second hybrid 130 so that the split signals are summed to port 134 along with the combined visual/digital signal.

An output signal from port 134 of the second hybrid 130 is a multiplexed composite signal having the aural and visual signals 10, 14, respectively, along side the digital signal 5. The combined analog and digital television channels 2, 4, respectively, are simultaneously applied to an antenna 140 for transmitting to a receiver.

Figure 4:
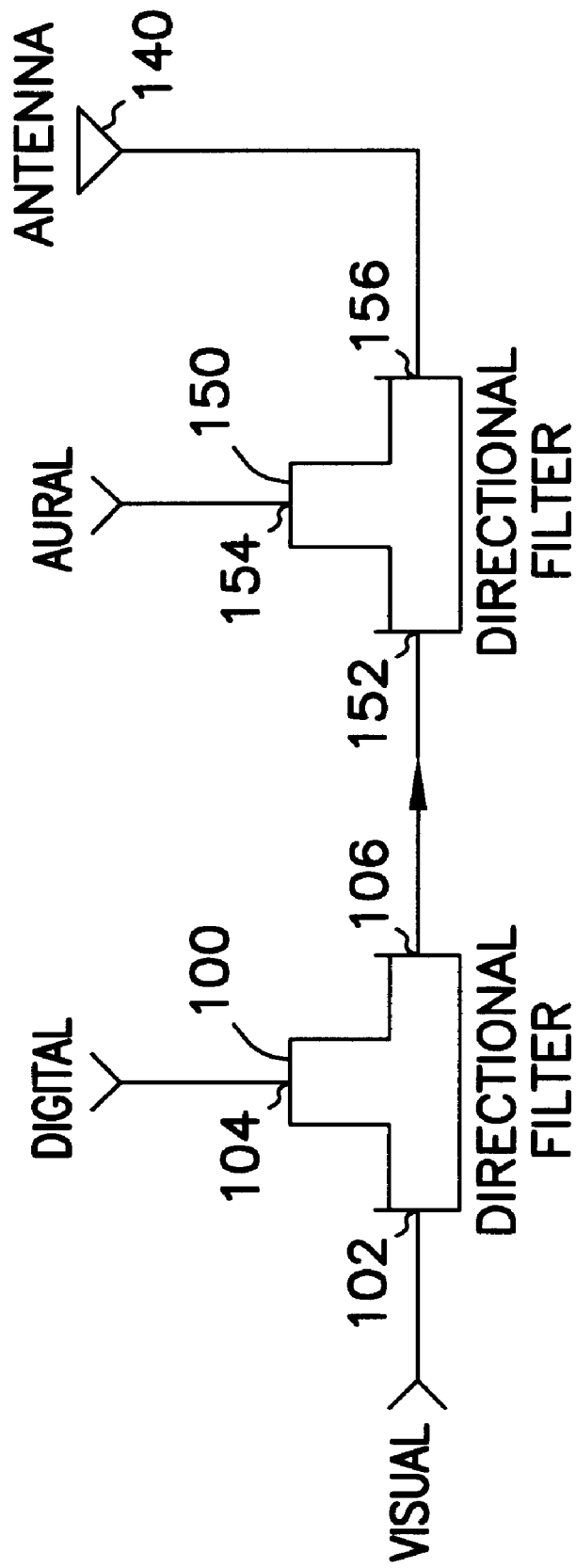
FIG. 4 is an alternative embodiment of an adjacent channel combiner according to the teachings of the present invention.

FIG. 4 is an alternative embodiment of an adjacent channel combiner 50 according to the teachings of the present invention. In lieu of using the notch diplexer 110 as illustrated in FIG. 3, a second directional filter 150 is positioned to receive the combined visual/digital signal from the first directional filter 100. As the second directional filter receives the combined visual/digital signal via input 152, the aural signal 10 is applied to input port 154. The second directional filter 150 combines the two signals together for output port 156. Output port 156 is coupled to antenna 140 for simultaneous transmission of the combined analog and digital television channels 2, 4, respectively.

Figure 5:
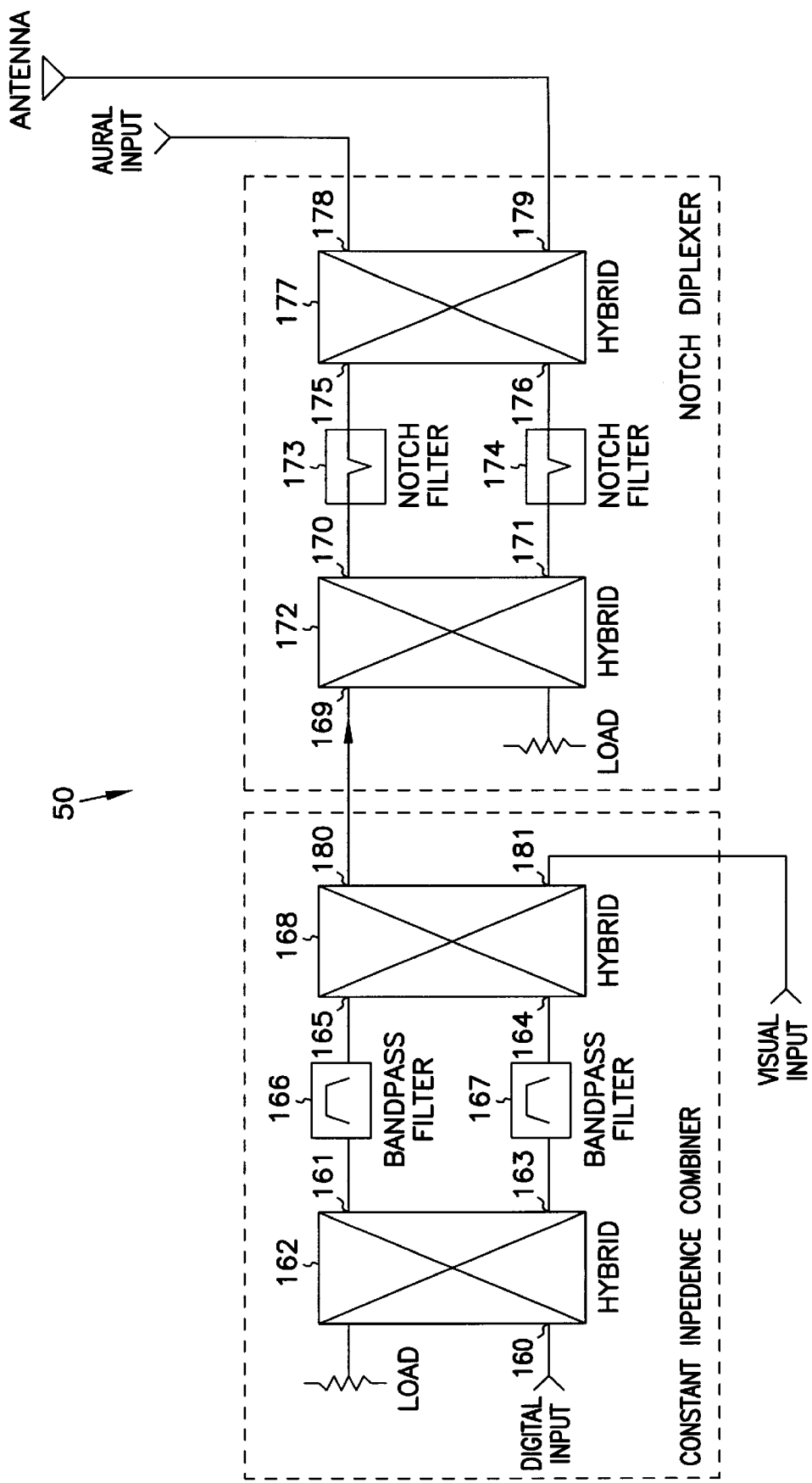
FIG. 5 is an alternative embodiment of an adjacent channel combiner according to the teachings of the present invention.

FIG. 5 is another alternative embodiment of an adjacent channel combiner 50 according to the teachings of the present invention. Similar to FIG. 3, but using a "constant impedance" combiner in lieu of a directional filter, a similar result is obtained. The digital signal is applied to port 160 of the hybrid 162, causing the signal to split equally to ports 161 and 163. The signals pass through the bandpass filters 166 and 167, and appear at ports 165 and 164 of the second hybrid 168. The two signals are then summed to port 180, which then connects to the notch displexer.

The visual signal is combined by applying it to port 181 of hybrid 168, which causes an equal split of the signal to ports 165 and 164. These two signals then travel to the two bandpass filters 166 and 167, where they are reflected, since the bandpass filters are tuned to pass the digital channel, not the visual signal. The two signals reflect back to ports 165 and 164, are combined by hybrid 168 to port 180, where the visual signal is summed with the digital signal. This combined signal is then applied to the notch diplexer as in FIG. 3, and the same process is used to add the aural signal.

An adjacent channel combiner 50 has been described for combining an analog television channel 2 (having a visual signal 14 and an aural signal 10) with an upper adjacent digital television channel 4 (having a digital signal 5) by combining the aural signal 10 after both the visual signal 14 and the digital signal 5 have been combined. A directional filter 100 combines the visual signal 14 and the digital signal 5 with a simple bandpass directional filter since the aural signal 10 is not yet present. The aural signal 10 is added to the combined visual/digital signal via a notch diplexer 110. The analog and digital channels 2, 4, respectively, have been combined without the use of complex filter designs or techniques. A combined analog channel 2 and digital channel 4 allows for the simultaneous transmission of two adjacent channels using a single transmission line 72.

Although specific embodiments have been illustrated and described herein, it will be appreciated by those skilled in the art that any arrangement which is calculated to achieve the same purpose may be substituted for the specific embodiment of the present invention. This application is intended to cover any adaptations or variations of the present invention.

What is claimed is:

1. A channel combiner, comprising:
   a directional filter for combining a digital signal of a digital television channel with a visual signal of an analog television channel; and
   a diplexer for combining the combined digital and visual signal with a separate aural signal of the analog television channel for transmission using a common path.

2. The channel combiner of claim 1 wherein the digital television channel is upper adjacent to the analog television channel.

3. The channel combiner of claim 2 wherein the digital television channel is the next immediately adjacent television channel next higher in frequency than the analog television channel.

4. The channel combiner of claim 1 wherein the visual signal is a vestigial side-band, amplitude-modulated, bandwidth limited picture signal having its carrier centered 1.25 MHZ from a lower edge of the analog television channel.

5. The channel combiner of claim 1 wherein the aural television signal is a frequency modulated sound signal having its carrier centered 250 KHZ from an upper edge of the analog television channel.

6. The channel combiner of claim 1 wherein the digital television signal is an 8 level vestigial side band digitally modulated signal.

7. The channel combiner of claim 1 wherein the combined analog and digital television channels are applied to a single transmission line.

8. The channel combiner of claim 7 wherein the single transmission line is coupled to an antenna.

9. The channel combiner of claim 1 wherein the analog television channel and the digital television channel comprise different television program signals.

10. A method of combining an analog television channel with an immediately upper adjacent digital television channel, the method comprising:
    combining a digital signal of the digital television channel with a visual signal of the analog television channel; and
    combining an aural signal of the analog television channel with the combined digital and visual signal for transmission using a common path.

11. The method of claim 10 wherein combining a digital signal with a visual signal is performed using a directional filter.

12. The method of claim 10 wherein combining an aural signal with the combined digital and visual signal is performed using a diplexer.

13. The method of claim 10 wherein combining an aural signal with the combined digital and visual signal is performed using a directional filter.

14. A method of combining an analog television channel with an immediately upper adjacent digital television channel, the method comprising the steps of:
    receiving a digital signal operating within the digital television channel;
    receiving a visual signal operating within the analog television channel;
    combining the digital signal with the visual signal;
    receiving the combined digital and visual signal;
    receiving a separate aural signal operating within the analog television channel; and
    combining the aural signal with the combined digital and visual signal for transmission using a common path.

15. A television transmission system comprising:
    an analog transmitter for providing a visual signal and a separate aural signal, wherein both signals occupy an analog television channel;
    a digital transmitter for providing a digital signal, wherein the digital signal occupies a digital television channel that is upper adjacent to the analog television channel;
    an adjacent channel combiner for combining the analog television channel with the digital television channel, wherein the aural signal is combined after both the visual and digital signals have been combined;

a common transmission line for receiving the combined analog and digital channels; and an antenna for transmitting the combined analog and digital channels.

16. The television transmission system of claim 15 wherein the analog and digital transmitters operate in a UHF band.

17. The television transmission system of claim 15 wherein the analog and digital transmitters operate in a VHF band.

18. A channel combiner, comprising:

means for combining a digital signal with a visual signal, wherein the digital signal occupies an upper adjacent digital television channel and the visual signal occupies a first portion of a lower adjacent analog television channel; and means for combining the combined digital and visual signal with a separate aural signal that occupies a second portion of the lower adjacent analog television channel for transmission using a common path.

19. The channel combiner of claim 18 wherein the means for combining a digital signal with a visual signal comprises a directional filter.

20. The channel combiner of claim 18 wherein the means for combining the combined digital and visual signal with the separate aural signal comprises a diplexer.

21. The channel combiner of claim 18 wherein the means for combining the combined digital and visual signal with the separate aural signal comprises a directional filter.

* * * * *